(12) United States Patent
Lutz et al.

(10) Patent No.: US 11,565,553 B2
(45) Date of Patent: Jan. 31, 2023

(54) PNEUMATIC VEHICLE TYRE

(71) Applicant: Continental Reifen Deutschland GmbH, Hannover (DE)

(72) Inventors: Andre Lutz, Hannover (DE); Florian Kristen, Hannover (DE)

(73) Assignee: Continental Reifen Deutschland GmbH, Hannover (DE)

( * ) Notice: Subject to any disclaimer, the term of this patent is extended or adjusted under 35 U.S.C. 154(b) by 657 days.

(21) Appl. No.: 16/487,844

(22) PCT Filed: Jan. 15, 2018

(86) PCT No.: PCT/EP2018/050805
§ 371 (c)(1),
(2) Date: Aug. 22, 2019

(87) PCT Pub. No.: WO2018/153571
PCT Pub. Date: Aug. 30, 2018

(65) Prior Publication Data
US 2020/0247189 A1  Aug. 6, 2020

(30) Foreign Application Priority Data
Feb. 23, 2017  (DE) ............... 10 2017 202 939.0

(51) Int. Cl.
*B60C 11/13* (2006.01)
*B60C 11/03* (2006.01)
*B60C 11/11* (2006.01)

(52) U.S. Cl.
CPC ........... *B60C 11/0306* (2013.01); *B60C 11/11* (2013.01); *B60C 11/1315* (2013.01);
(Continued)

(58) Field of Classification Search
CPC ............ B60C 11/1315; B60C 11/1353; B60C 11/1369; B60C 2011/1338; B60C 2011/1361
See application file for complete search history.

(56) References Cited

U.S. PATENT DOCUMENTS

| 5,160,385 A | 11/1992 | Goto et al. |
| 6,000,451 A | 12/1999 | Takada |

(Continued)

FOREIGN PATENT DOCUMENTS

| DE | 60017184 T2 | 12/2005 |
| DE | 102010016977 A1 | 11/2011 |

(Continued)

OTHER PUBLICATIONS

International Search Report dated May 24, 2018 of international application PCT/EP2018/050805 on which this application is based.

*Primary Examiner* — Katelyn W Smith
*Assistant Examiner* — Philip N Schwartz
(74) *Attorney, Agent, or Firm* — Gregory Adams; David L. Cate

(57) ABSTRACT

The invention relates to a pneumatic vehicle tire having a tread with profile block rows (1, 2) with profile blocks (5) delimited by channels (3, 4), which channels (3, 4) form T-shaped intersections in plan view and are delimited by a channel base (6, 6') and by block flanks (5a, 5'a), wherein, in channels (3), there are formed projections (7, 7') which, in a radial direction, have at their highest point a height ($h_1$, $h_1'$), in relation to the lowest point of the channels (3), of 10% to 80% of the profile depth. The projections (7, 7') are positioned in intersection regions of T-shaped intersections of the channels (3, 4) and are attached to that block flank (5a) which is situated opposite the opening-in point of the opening-in channel (4).

16 Claims, 3 Drawing Sheets

Figure 1:
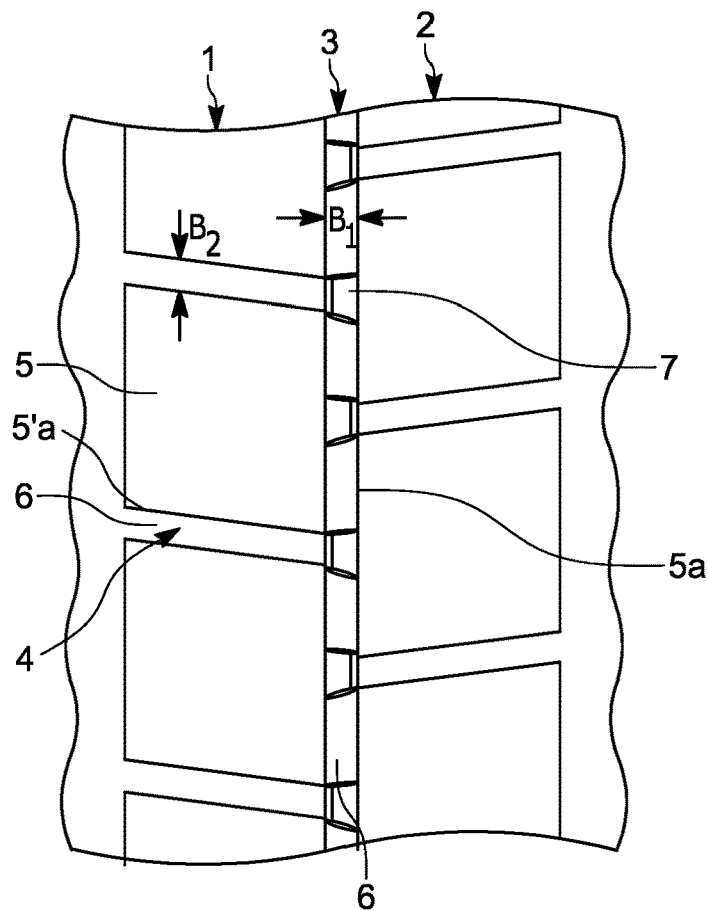

(52) U.S. Cl.
CPC ... *B60C 11/1353* (2013.01); *B60C 2011/0353* (2013.01); *B60C 2011/0369* (2013.01); *B60C 2011/1338* (2013.01); *B60C 2011/1361* (2013.01)

(56) References Cited

U.S. PATENT DOCUMENTS

| | | | |
|---|---|---|---|
| 2002/0170644 A1 | 11/2002 | Comps | |
| 2005/0076986 A1* | 4/2005 | Saguchi | B60C 11/11 152/209.21 |
| 2007/0062626 A1* | 3/2007 | Oyama | B60C 11/047 152/209.19 |

FOREIGN PATENT DOCUMENTS

| | | | | |
|---|---|---|---|---|
| DE | 102014224032 A1 | | 5/2016 | |
| EP | 0413502 A1 | | 2/1991 | |
| EP | 1473175 A1 | | 11/2004 | |
| JP | 2009292343 A | | 12/2009 | |
| JP | 2012020702 A | * | 2/2012 | ..... B60C 2011/1338 |
| JP | 2012020702 A | | 2/2012 | |
| KR | 20050047409 A | * | 5/2005 | ......... B60C 11/1353 |

* cited by examiner

PNEUMATIC VEHICLE TYRE

The invention relates to a pneumatic vehicle tire having a tread with profile block rows with profile blocks delimited by channels, which channels form T-shaped intersections in plan view and are delimited by a channel base and by block flanks, wherein, in channels, there are formed projections which, in a radial direction, have at their highest point a height, in relation to the lowest point of the channels, of 10% to 80% of the profile depth.

A pneumatic vehicle tire of said type is known for example from U.S. Pat. No. 6,000,451 A. The tread of this pneumatic vehicle tire has a block profile with three profile block rows running in the central tread region. On the channel base of the channels, there are formed differently dimensioned projections, which serve as stone ejectors.

U.S. Pat. No. 5,975,172 A has disclosed a pneumatic vehicle tire with two profile block rows running in encircling fashion in a circumferential direction in the middle region of the tread. The two profile block rows are separated from one another by a circumferential channel, wherein a multiplicity of projections which follow one another in a circumferential direction and which are of rectangular cross section is formed, as stone ejectors, on the channel base of the circumferential channel.

Stone ejectors prevent stones from becoming caught in channels of treads, and/or promote the ejection of stones that have become caught, and thus protect the channel bases against damage. The known projections which serve as stone ejectors are positioned in freestanding fashion on the channel bases of the channels and are formed jointly with the tread profile during the vulcanization of the tire in a vulcanization mold. The known freestanding projections require a sufficiently large channel width, and the channels must in particular have a wide channel base. In tires with treads which have relatively narrow circumferential channels owing to a low rolling resistance and better wear performance, the known stone ejectors can no longer be positioned.

The invention is therefore based on the object, in the case of a pneumatic vehicle tire of the type mentioned in the introduction, of designing projections which serve as stone ejectors such that they can be formed even in narrow channels with channel bases only 3.0 mm to 6.0 mm wide, and such that they exhibit the desired action over the service life of the tire.

The stated object is achieved according to the invention in that the projections are positioned in the intersection regions of T-shaped intersections of the channels and are attached there to that block flank which is situated opposite the opening-in point of the opening-in channel.

The positioning of the projections in each case in an intersection region of the T-shaped intersection of channels and the attachment to the block flank situated opposite the opening-in channel permits a stable and effective design of the projections which serve as stone ejectors, even in very narrow channels or on narrow channel bases. The invention in particular also reduces the risk of stones becoming caught in so-called pockets—the intersection regions of channels, in particular of circumferential channels with transverse channels. The tread of the tire can thus be provided with narrow circumferential channels in order to keep the rolling resistance as low as possible and in order to realize a long service life.

In a preferred design variant, the projections have, at the block flank to which they are attached, a width which amounts to 90% to 120% of the width of the opening-in channel at the opening-in point at the tread periphery. By means of such projections, the risk of stones becoming caught on the tread is particularly low. Should a stone nevertheless become caught at a T-shaped intersection, such projections promote the ejection of the stones as the T-shaped intersection exits the ground contact patch in a particularly effective manner.

The stone-ejecting action of the projections is additionally improved if the projections have, at their thickest point in relation to the level of the block flank, a thickness of 40% to 100%, in particular of at least 50%, of the width, determined at the tread periphery, of the channel in which the projections are formed.

In a preferred design variant, the channel in which the projections are formed has, at the channel base, a width of 3.0 mm to 6.0 mm, in particular of at most 4.0 mm, and is preferably a circumferential channel. Such narrow channels reduce the void volume of the tread, thereby reducing the rolling resistance and improving the wear performance.

For the stone-ejecting action of the projections, it is furthermore also advantageous if the height of the projections at their highest point amounts to at least 5.0 mm. The height of the projections preferably amounts to 20% to 60%, in particular at least 50%, of the profile depth.

In a further preferred design variant, the width of the projections decreases in the direction of the opening-in channels of the T-shaped intersections, in particular to the width of the opening-in channels at the channel base.

For the stability of the projections, it is advantageous for the projections to be delimited in each case by a top surface which is inclined at an angle of 45° to 90°, in particular of at most 60°, with respect to the radial direction. The stone ejection effect is also positively influenced by means of such inclined top surfaces.

For the stability of the projections, it is also advantageous if the top surface of the projections is inclined such that the height of the projections is at its greatest at the block flank. The height of the projections therefore decreases to the channel that opens in at the T-shaped intersection.

In a further preferred design variant, the top surface of the projections is trapezoidal in plan view.

In a further embodiment of the projections which is expedient for the stability of the projections, said projections are delimited in the direction of the opening-in channels of the T-shaped intersections in each case by a flank surface which is inclined at an angle of 15° to 30° with respect to the radial direction.

In a further preferred design variant, the projections are substantially cuboidal.

In a further advantageous design variant, on the channel base of opening-in channels, there are formed base elevations which are attached to the block flanks and which adjoin the projections and which have a height in a radial direction of 5% to 10% of the depth of the opening-in channels and which extend over 10% to 100% of the extent length of the opening-in channels. By means of such base elevations, the channel base of the opening-in channel is, in the region of the T-shaped intersection, additionally also protected against damage by stones caught at the T-shaped intersection. Additionally, such base elevations have a stabilizing effect on the projections in the intersection regions of the T-shaped intersections.

In a further design variant of the invention, on the channel base of opening-in channels, there are formed base elevations which are attached to the block flanks and which do not directly adjoin the projections and which reduce the depth of the opening-in channels, over at least 50% of their extent length, to 60% to 80%.

The channels forming the T-shaped intersections preferably run at an angle of 90°, or at an angle which deviates from 90° by up to 30°, in particular by up to 20°, with respect to one another with regard to their centerlines, which in plan view are oriented in an extent direction.

Figure 2:
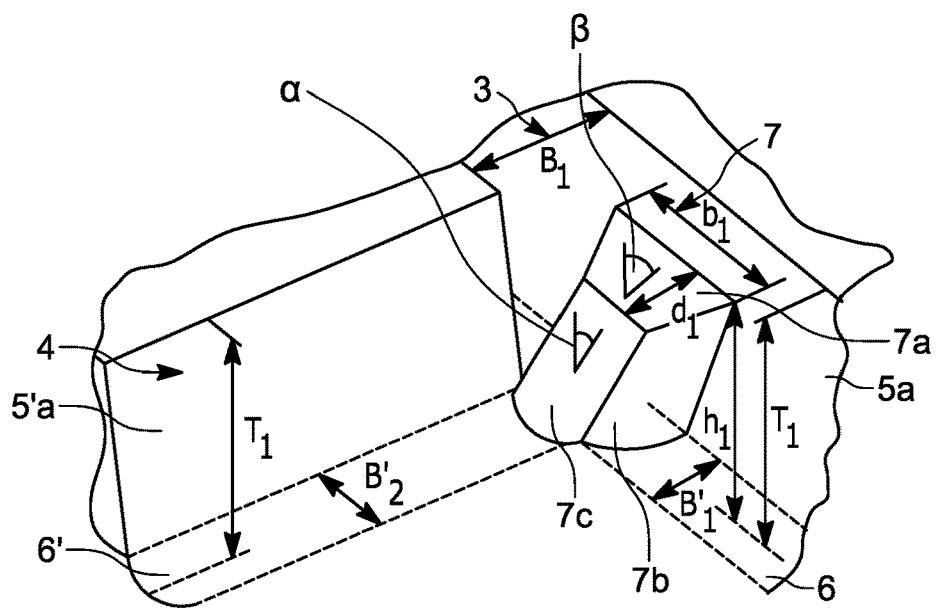
Figure 3:
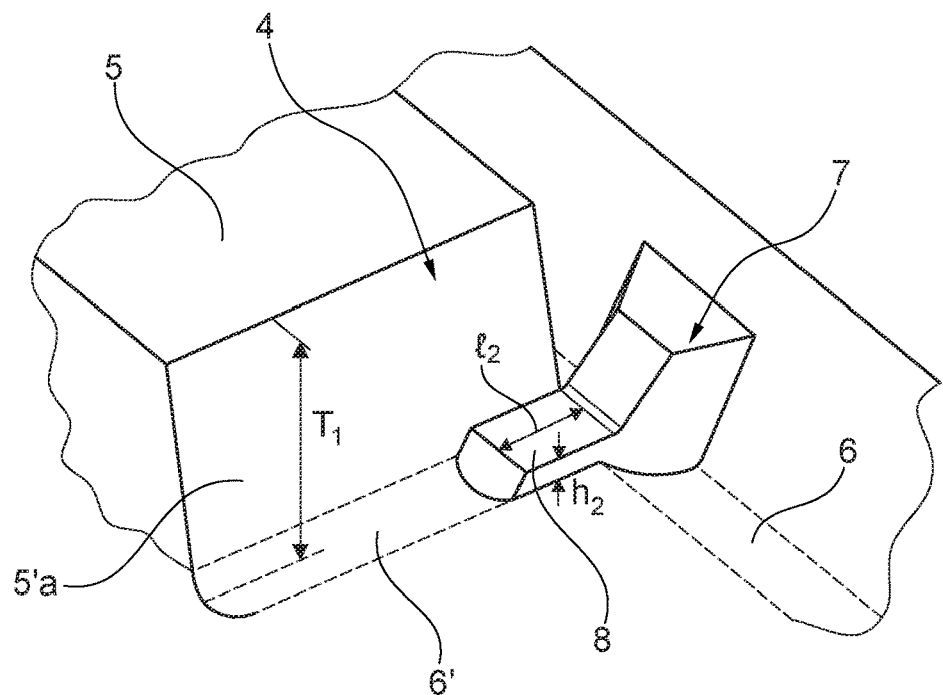
Figure 4:
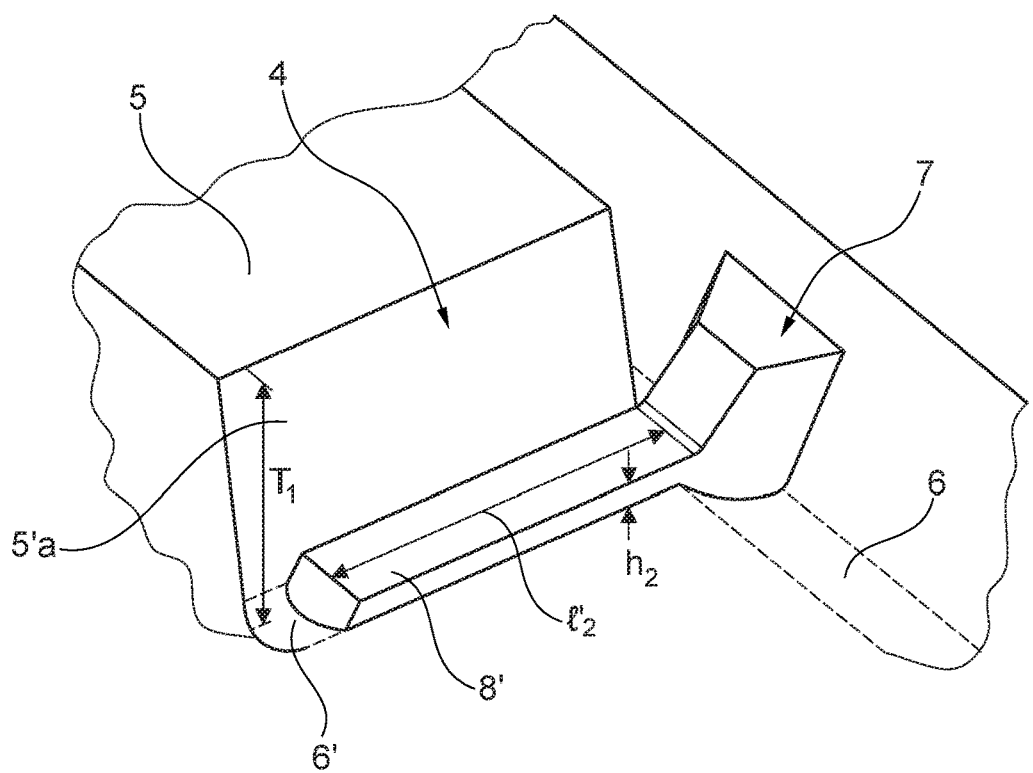
Figure 5:
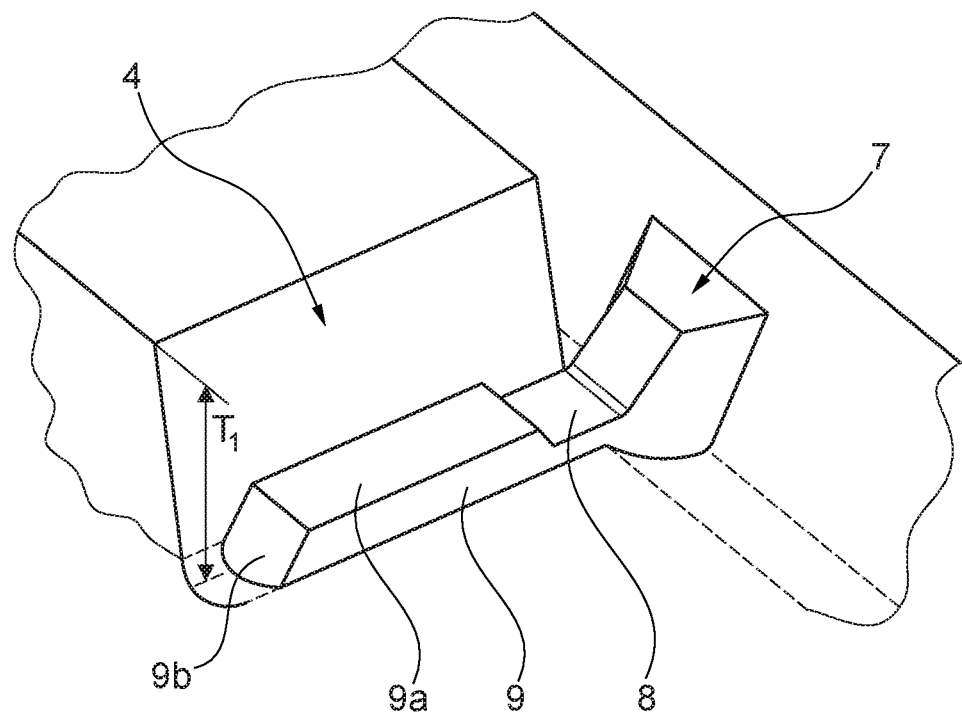
Figure 6:
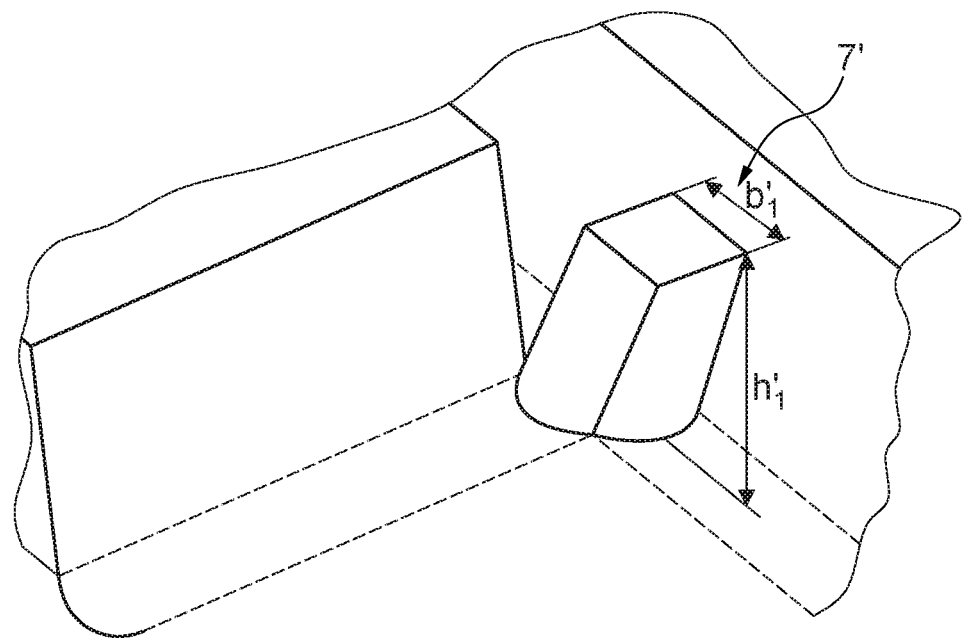

Further features, advantages and details of the invention will now be described in more detail on the basis of the drawing, which schematically shows multiple exemplary embodiments of the invention. In the drawing:

FIG. 1 shows a simplified plan view of a detail of a tread of a pneumatic vehicle tire with a design variant of the invention, FIG. 2 shows a simplified oblique view of the tread shown in FIG. 1, in the region of a channel intersection, FIG. 3 shows a view analogous to FIG. 2, with a second design variant of the invention, FIG. 4 shows a view analogous to FIG. 2, with a third design variant of the invention, FIG. 5 shows a view analogous to FIG. 2, with a fourth design variant of the invention, and FIG. 6 shows a view analogous to FIG. 2, with a fifth design variant of the invention.

The invention is concerned with a particular design of a tread of a pneumatic vehicle tire of radial type of construction, in particular of a utility vehicle tire or of an off-road tire or of a tire for light trucks. Pneumatic vehicle tires designed according to the invention are provided and suitable in particular for use on stony underlying surfaces, for example on gravel roads, building sites or off-road.

FIG. 1 shows circumferential portions of two profile block rows 1, 2 which run adjacent to one another in the central tread region and which are separated from one another by a circumferential channel 3 running in straight fashion in plan view and which each have a multiplicity of profile blocks 5, which profile blocks follow one another in a circumferential direction and are separated from one another by transverse channels 4. The profile blocks 5 of the profile block row 1 are arranged so as to be offset in a circumferential direction with respect to the profile blocks 5 of the profile block row 2, such that the transverse channels 4 open from the two profile block rows 1, 2 into the circumferential channel 3 in an offset manner with respect to one another in a circumferential direction. Each transverse channel 4 thus forms, together with the circumferential channel 3, a "T-shaped intersection" in plan view.

In the design variant shown, the transverse channels 4 within each profile block row 1, 2 run parallel to one another, in straight fashion and at an angle which deviates from the transverse direction by up to 45°, though may also run in the transverse direction, in plan view. The circumferential channel 3 and the transverse channels 4 each have, at their lowest point in a radial direction, a depth $T_1$ (FIG. 2) which corresponds to the maximum provided profile depth, which in the case of utility vehicle tires commonly amounts to 12.0 mm to 20.0 mm. Furthermore, the circumferential channel 3 has a width $B_1$ at the tread periphery, and each transverse channel 4 has a width $B_2$ at the tread periphery, wherein the widths $B_1$, $B_2$ amount in each case to 4.0 mm to 12.0 mm.

The profile blocks 5 are delimited with respect to the channels that delimit them, which in FIG. 1 are the circumferential channel 3 and the transverse channels 4, by block flanks 5a, 5'a, which in turn, together with channel bases 6, 6', delimit the circumferential channel 3 and the transverse channels 4. The block flanks 5a, 5'a either run in a radial direction or are, in a known manner, inclined with respect to the radial direction at an angle of in particular up to 15°, wherein the channels 3, 4 have their smallest width $B_1'$, $B_2'$ (FIG. 2) of 3.0 mm to 6.0 mm, in particular of at most 4.0 mm, at the radially innermost points of the block flanks 5a, 5'a. The widths $B_1'$, $B_2'$ therefore correspond to the widths of the rounded channel bases 6, 6' of the channels 3, 4.

As shown by FIG. 1 together with FIG. 2, block-like projections 7 are formed in the circumferential channel 3 in the intersection regions of the T-shaped intersections of the channels 3, 4, which projections are seated on the channel base 6 of the circumferential channel 3 and are attached to the block flank 5a situated opposite the opening-in point of the respective transverse channel 4. The projections 7 act as so-called stone ejectors, which prevent stones from becoming permanently caught at the critical intersection regions of the T-shaped intersections of the channels 3, 4.

As per FIG. 2, each projection 7 is delimited in a radial direction by a top surface 7a, in a circumferential direction by two side surfaces 7b, and facing or with respect to the respective transverse channel 4 by a flank surface 7c, which adjoins the two side surfaces 7b and the top surface 7a.

The top surface 7a has the form of an isoceles trapezoid, wherein the base of the trapezoid (relatively long bottom side) lies against the block flank 5a. Each projection 7 therefore has its greatest width $b_1$, determined in a circumferential direction, at the block flank 5a, which width amounts to 90% to 120%, in the exemplary embodiment as per FIG. 2 more than 100%, of the width determined at the opening-in point of the transverse channels 4 at the tread periphery. The width of the projection 7 decreases continuously, correspondingly to the trapezoidal top surface 7a, to the respective transverse channel 4, wherein the width preferably decreases to the magnitude of the width $B_2'$ of the channel base 6' of the transverse channel 4. The two side surfaces 7b are thus correspondingly inclined with respect to the extent direction of the circumferential channel 3. The top surface 7a runs at an angle β of 45 to 90°, in particular of at most 60°, with respect to the radial direction, and is, in the case of an angle β which deviates from 90°, inclined such that, at the block flank 5a, the projection 7 has its greatest height $h_1$ in a radial direction with respect to the lowest point of the circumferential channel 3. The height $h_1$ of the projections 7 amounts in each case to 10% to 80%, in particular 20% to 60%, and preferably at least 50%, of the depth $T_1$. The height $h_1$ of each projection 7 particularly preferably amounts to at least 5.0 mm. The flank surface 7c is substantially rectangular, runs at an angle α of 15° to 30° with respect to the radial direction, and ends at the channel base 6' of the respective transverse channel 4. Furthermore, the projection 7 has, in relation to the level of the block flank 5a, at right angles with respect to said block flank, to which said projection is attached, a thickness $d_1$ at the top of the projection at its thickest point of 40% to 100%, in particular of at least 50%, of the width $B_1'$ of the circumferential channel 3.

In the design variants described below on the basis of FIGS. 3 to 5, constituent parts of the tread designed correspondingly to the explanations relating to FIG. 1 and FIG. 2 are denoted by the same reference designations. Likewise, constituent parts designed correspondingly in FIGS. 3 to 5 are denoted by the same reference designations.

The design variants shown in FIG. 3 and FIG. 4 differ from the design variant as per FIG. 2 in that, on the channel base 6' of the transverse channels 4, there is formed in each case one flat, elongate base elevation 8, 8', which adjoins the respective projection 7 and which is fastened to the block flanks 5'a of the profile blocks 5. The base elevation 8, 8' has a height $h_2$ in a radial direction in relation to the lowest point of the transverse channel 4 of 5% to 10% of the depth $T_1$, wherein the height $h_2$ amounts to at least 1.0 mm, in particular at least 2.0 mm. The base elevation 8 provided in FIG. 3 furthermore has an extent length $l_2$ of 5.0 mm to 15.0 mm, the base elevation 8' provided in FIG. 4 has an extent length 12' of 30% to 100%, in particular, as shown in FIG. 4, of at least 50%, of the extent length of the respective transverse channel 4, wherein the extent length $l_2$, $l_2'$ and the extent length of the transverse channel 4 are determined along a centerline oriented in a channel running direction of the respective transverse channel 4.

FIG. 5 shows a design variant in which a projection 7, a base elevation 8 designed as per FIG. 3 and a further base elevation 9 which adjoins said base elevation 8 and which runs in the transverse channel 4 are provided. The base elevation 9 is delimited in a radial direction by a top surface 9a running parallel to the tread periphery and furthermore by two flank surfaces 9b which are inclined in relation to the radial direction. The base elevation 9 reduces the depth of the respective transverse channel 4, over at least 50% of its extent length, to 60% to 80% of the depth $T_1$. The base elevation 9 runs at most to the second end of the transverse channel 4.

FIG. 6 shows a design variant with a substantially cuboidal projection 7' which is positioned within the circumferential channel 3 and which is positioned analogously to the projection 7 (FIG. 1 to FIG. 5). The projection 7' has a width $b_1'$ determined in a circumferential direction, which, analogously to the width $b_1$ of the projection 7, amounts to 90% to 120%, in the exemplary embodiment shown 100%, of the width of the transverse channel 4 determined at the opening-in point and at the tread periphery. Furthermore, the projection 7' has, in a radial direction, a height $h_1'$ which amounts to 10% to 80%, in particular 20% to 60%, and particularly preferably at least 50%, of the depth $T_1$ of the circumferential channel 3.

It is furthermore pointed out that T-shaped intersections are to be understood to mean intersections at which channels run at an angle of 90°, or at an angle which deviates from 90° by up to 30°, in particular by up to 20°, with respect to one another with regard to their centerlines, which in plan view are oriented in an extent direction. The projections 7, 7' are preferably provided exclusively in the intersection regions of the T-shaped intersections of the channels.

The projections may have shapes which deviate from the shapes described, and in particular may be formed with rounded edges and corners. For example, the projections may be designed in the form of halved circular cylinders, or to be triangular in plan view.

LIST OF REFERENCE DESIGNATIONS

1, 2 . . . Profile block row
3 . . . Circumferential channel
4 . . . Transverse channel
5 . . . Profile block
5a, 5'a . . . Block flank
6, 6' . . . Channel base
7, 7' . . . Projection
7a . . . Top surface
7b . . . Side surface
7c . . . Flank surface
8, 8', 9 . . . Base elevation
9a . . . Top surface
9b . . . Flank surface $B_1$, $B_2$, $B_1'$, $B_2'$, $b_1$, $b_1'$ . . . Width
$d_1$ . . . Thickness
$h_1$, $h_1'$, $h_2$ . . . Height
$l_2$, $l_2'$ . . . Length
$T_1$ . . . Depth
$\alpha$, $\beta$ . . . Angle

The invention claimed is:

1. A pneumatic vehicle tire having a tread with profile block rows with profile blocks delimited by channels comprised of circumferential channels and transverse channels, wherein the channels form T-shaped intersections in plan view and are delimited by a channel base and by block flanks, wherein, in the circumferential channels, there are formed projections which, in a radial direction, have at their highest point a height, in relation to the lowest point of the circumferential channels, of 10% to 80% of depth of the circumferential channels;
   wherein the projections are positioned in intersection regions of T-shaped intersections of the channels and are attached to a block flank situated opposite the opening in point of the opening in a transverse channel; and,
   wherein each top surface of the projections is trapezoidal in plan view;
   base elevations are formed on the channel base of openings in the transverse channels, the base elevations are attached to the block flanks and which adjoin the projections, wherein the base elevations have a height in a radial direction of 5% to 10% of the depth of the opening in the transverse channels, and wherein the base elevations extend over 10% to 100% of the extent length of the opening in the transverse channels.

2. The pneumatic vehicle tire as claimed in claim 1, wherein the projections have, at the block flank to which they are attached, a width which amounts to 90% to 120% of the width of the opening in channel at the opening in point at periphery of the tread.

3. The pneumatic vehicle tire as claimed in claim 1, wherein the projections have, at their thickest point in relation to a level of the block flank, a thickness of from 40% to 100% of the width, determined at the tread periphery, of the circumferential channel in which the projections are formed.

4. The pneumatic vehicle tire as claimed in claim 1, wherein the projections have, at their thickest point in relation to a level of the block flank, a thickness of from 50% to 100% of the width, determined at the tread periphery, of the circumferential channel in which the projections are formed.

5. The pneumatic vehicle tire as claimed in claim 1, wherein the circumferential channel in which the projections are formed has, at the channel base, a width of 3.0 mm to 6.0 mm.

6. The pneumatic vehicle tire as claimed in claim 1, wherein the circumferential channel in which the projections are formed has, at the channel base, a width of 3.0 mm to 4.0 mm.

7. The pneumatic vehicle tire as claimed in claim 1, wherein height of the projections at their highest point amounts to at least 5.0 mm.

8. The pneumatic vehicle tire as claimed in claim 1, wherein height of the projections amounts to 20% to 60% of the depth of the circumferential channels.

9. The pneumatic vehicle tire as claimed in claim 1, wherein height of the projections amounts to 50% to 80% of the depth of the circumferential channels.

10. The pneumatic vehicle tire as claimed in claim 1, wherein width of the projections decreases in the direction of the opening in the transverse channels of the T-shaped intersections.

11. The pneumatic vehicle tire as claimed in claim 10, wherein the width of the projections decreases from the block flank towards the direction of the opening in the transverse channels at a base of the transverse channels.

12. The pneumatic vehicle tire as claimed in claim 1, wherein the projections are delimited in a radial direction in each case by a top surface which is inclined at an angle ($\beta$) of from 45° to 90 with respect to the radial direction.

13. The pneumatic vehicle tire as claimed in claim 12, wherein the projections are delimited in a radial direction in each case by a top surface which is inclined at an angle ($\beta$) of from 45° to 60° with respect to the radial direction.

14. The pneumatic vehicle tire as claimed in claim 12, wherein the top surface of the projections is inclined such that height of the projections is at its greatest at the block flank.

15. The pneumatic vehicle tire as claimed in claim 1, wherein the projections are delimited in the direction of the opening in the transverse channels of the T-shaped intersections in each case by a flank surface which is inclined at an angle ($\alpha$) of from 15° to 30° with respect to a radial direction.

16. The pneumatic vehicle tire as claimed in claim 1, wherein the channels forming T-shaped intersections run at an angle which deviates from 90° by up to 20°, with respect to each other.

\* \* \* \* \*